United States Patent
Tyler, III et al.

[15] 3,687,954
[45] Aug. 29, 1972

[54] CERTAIN DIFLUORAMINO COMPOUNDS

[72] Inventors: William E. Tyler, III, New Providence; John R. Lovett, Edison, both of N.J.

[73] Assignee: Esso Research and Engineering Company

[22] Filed: May 27, 1963

[21] Appl. No.: 283,951

[52] U.S. Cl. ........260/268 R, 260/268 N, 260/268 S, 260/268 DK, 260/268 MK, 260/488 R, 260/488 F, 260/488 J, 260/556 A, 260/556 AR, 260/561 R, 260/583 NH, 260/584 R, 149/92, 149/109
[51] Int. Cl. .....................C07d 51/72, C07c 87/22
[58] Field of Search..260/583, 556, 584, 268, 268 R, 260/268 S, 488 R, 488 F, 488 J, 556 A, 556 AR, 268 N, 268 DK, 561 R, 583 NH, 584 R, 268 MK

[56] References Cited

OTHER PUBLICATIONS

Hoffman et al., Chem. Reviews, Vol. 62, pp. 12–18 (1962) QD1 A563

Primary Examiner—Leland A. Sebastian
Attorney—Whelan, Chasan, Marx & Wright and Henry Berk

EXEMPLARY CLAIM

1. A compound having the composition of the general formula:

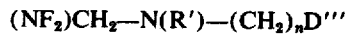

$(NF_2)CH_2—N(R')—(CH_2)_nD'''$ where R' is a negative function of the group consisting of nitro, sulfonyl, aldo, acyl, hydroxyl, and halo;

D''' is a moiety of the group consisting of $—NF_2$, acyloxy, alkoxy and halo functions, alkyl, and a $—N(R')CH_2NF_2$ radical, subscript $n$ representing one to two ($—CH_2—$) groups between two $—N(R')—B$ groups, otherwise being one;

said compound in the cyclic analog form having one to two $—N(R')—$ groups, each linked to two carbons in the ring, the carbons in the ring being in $—CH(NF_2)$ groups instead of ($—CH_2—$) groups except for any other carbons in the ring linked to one of the mentioned replaceable functions and to a hydrogen atom; and said compound also taking the form $(NF_2)CH_2—N(R')—(CHNFD2)_2—D'''$ when $D'''$ is the radical $—N(R')CH_2NF_2$.

9. The compound 1,4-dinitro 2,3,5,6-tetrakis ($NF_2$) piperazine.

10. Method of preparing an $NF_2$-containing compound from an organic nitrogen-containing compound in which a replaceable function of the group consisting of acyloxy, alkoxy, and chloro is linked to a carbon alpha to a nitrogen atom in the organic compound and a negative function of the groups consisting of nitro, sulfonyl, aldo, acyl, hydroxyl, and a halo function of the group consisting of fluoro and chloro, chloro, is linked to said nitrogen atom, which comprises reacting the organic compound with $HNF_2$ under reaction conditions to replace the replaceable function by a difluoramino group and recovering a resulting $NF_2$-containing compound wherein $NF_2$ replaces the replaceable function of the organic nitrogen-containing compound.

20 Claims, No Drawings

CERTAIN DIFLUORAMINO COMPOUNDS

This invention relates to the preparation of novel high-energy $NF_2$-containing compounds by reaction of difluoramine, $HNF_2$, with aliphatic and cyclic organic compounds containing a replaceable function (R'') such as acyloxy, alkoxy, or halo linked through a carbon atom to nitrogen which is linked to a negative or acid functional group (R') such as nitro, sulfonyl, aldo, acyl, hydroxyl, or halo function. Mainly, the thus linked nitrogen may be considered as being in an R' substituted imino group, —N(R')— linked to two alpha carbon constituents:

the two carbon atoms alpha to the imino N being in —$CH_2$—, —$CH(R'')$—, or —$CH_2(R'')$ groups.

The suitable organic imine reactants have a variety of compositions and structures represented by the following general formula:

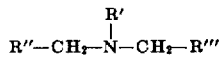

Where R'' is a replaceable function, e.g., acetoxy, methoxy, their acyloxy and alkoxy homologs or halo; R' is the negative function, e.g., nitro, —$NO_2$, sulfonyl, —$SO_2R$, aldo, —CHO, acyl,

hydroxyl, —OH, —F, or —Cl; and R''' is a replaceable group such as R'', alkyl or a duplication of R''—$CH_2$—$N(R')$— with one to two or more —$CH_2$— groups between a pair of substituted imino N atoms. When there is such a pair, —$CH(R'')$— group may be present instead of —$CH_2$— groups. In the analogous cyclic imines, mono- or di-imines, the general parent formula is represented by:

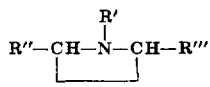

in which the groups shown can be multiplied, e.g., all doubled as in the piperazine derivative:

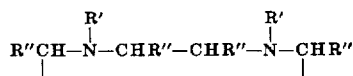

Thus, for the sake of simplicity and brevity, the cyclic imines are termed the cyclic analogs of the aliphatic compounds having the general formula:

The reaction of $HNF_2$ with the organic compound containing the replaceable R'' function and the acid R' function joined to nitrogen may be performed at temperatures in the range of 20° to 200° C., preferably with the aid of an acid catalyst such as sulfonated polystyrene. A catalyst of this type is known commercially as Amberlyst 15. To aid the reaction, it is preferably, but not necessarily carried out in the presence of an inert solvent such as methylene chloride free of moisture, and the $HNF_2$ reactant is used in excess of stoichiometric proportion to the replaceable groups which are to be replaced by $NF_2$ groups The following examples are intended to illustrate the method of carrying out the reactions by which good yields have been achieved.

EXAMPLE 1

To 2.5 ml. of dried methylene chloride in a 10 ml. glass bomb was added 0.99 gm. of N,N' diacetoxymethyl ethylene dinitramine,

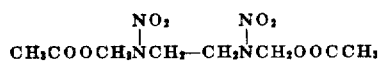

and 0.10 g. of dried Amberlyst 15 catalyst. To this was added 1 gm. of $HNF_2$. The reaction was stirred 24 hours and then the excess $HNF_2$ was removed. The solution was pipetted from the reactor and solvent was removed on a warm water bath. The residue was sublimed at 0.001 mm. and 60° C. to give a near quantitative yield of the product, m.p. 36° to 40° C. It has the following analysis:

|   | Found | Calculated for $F_2N$—$CH_2$—$\overset{NO_2}{\underset{|}{N}}$—$CH_2$—$CH_2$—$\overset{NO_2}{\underset{|}{N}}$—$CH_2$—$NF_2$ |
|---|---|---|
| C | 17.5 | 17.2 |
| N | 29.3 | 30.0 |
| F | 26.6 | 27.1 |

The above analysis and IR spectrum are consistent with the structure N,N' bis(difluoroaminomethyl) ethylene dinitramine.

EXAMPLE 2

A solution of 0.92 gm. of N,N' bis(acetoxymethyl) methylene dinitramine,

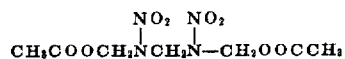

in 4 ml. of dried $CH_2Cl_2$, 100 mg. of Amberlyst 15 and 1 gm. $HNF_2$ were placed in a glass pressure bomb. The bomb was closed and the reaction stirred at room temperature for 5 days. After removal of the excess $HNF_2$, the solution was pipetted from the bomb. The solvent was removed in a stream of dry $N_2$ and the residue sublimed twice to give a good yield of product, m.p. 78° to 80° C., with the following characteristics:

|   | Found | Calculated for $(F_2NCH_2$—$\overset{NO_2}{\underset{|}{N}})_2CH_2$ |
|---|---|---|
| C | 13.72 | 13.53 |
| N | 30.91 | 31.58 |
| F | 28.0 | 28.56 |

The above chemical analysis and the IR spectrum of the material are consistent with the structure N,N' bis(difluoraminomethyl) methylene dinitramine.

This product was found to have a moderate shock sensitivity of 18 kg. in. and an excellent thermal stability indicated by evolution of 2 cc. gas under standard conditions per gram in 23 hrs. at 90° C.

EXAMPLE 3

A solution of 0.2 gm. of N,N di(acetoxymethyl) nitramine,

in 4 ml. of dried $CH_2Cl_2$ was placed in a 10 ml. glass pressure bomb with 100 mg. Amberlyst 15. Into the bomb was condensed 0.25 gm. $HNF_2$ and the bomb was sealed. The reaction was stirred at 50° C. for 14 hours, after which the excess $HNF_2$ was removed. The solution was pipetted from the bomb and the solvent was removed at room temperature under reduced pressure. The residue was distilled at a bath temperature of 50° C. and pressure of 0.01 mm. to give a colorless liquid with the following properties:

|   | Found | Calculated for $(F_2NCH_2)_2\overset{NO_2}{N}$ |
|---|---|---|
| C | 12.34 | 12.57 |
| N | 29.24 | 29.17 |

The above analysis and its IR spectrum are consistent with the structure N,N bis(difluoraminomethyl) nitramide.

EXAMPLE 4

To a 12 ml. glass pressure bomb was added a solution of 0.98 gm. of N,N di(acetoxymethyl)tosyl amide,

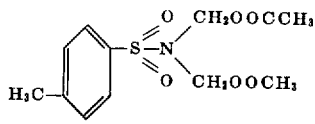

in 7.0 ml. $CH_2Cl_2$, 100 mg. Amberlyst 15 and 1.0 gm. $HNF_2$. The bomb was closed and stirred at 50° C. overnight. After removing the excess $HNF_2$, the solution was pipetted from the bomb and the solvent was removed. The residue was sublimed at 0.05 mm. and at a bath temperature of 50° C. to give a white solid, m.p. 73° to 75° C., with the following characteristics:

|   | Found | Calculated for $(F_2NCH_2)_2NTs$ |
|---|---|---|
| C | 36.82 | 35.88 |
| H | 3.79 | 3.68 |
| F | 24.60 | 25.23 |

The above analysis and IR spectrum are consistent with the structure N,N bis(difluoraminomethyl)tosyl amide. Ts represents the p-toluene sulfone group.

EXAMPLE 5

To a 12 ml. glass pressure bomb was added 1.01 gm. of N,N di(acetoxymethyl)acetamide,

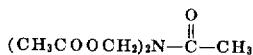

in 5.5 ml. of dried $CH_2Cl_2$, 100 mg. Amberlyst 15 and 1.0 gm. of $HNF_2$. The bomb was closed and the reaction stirred at room temperature for 3 days. The excess $HNF_2$ was removed and the solution was pipetted from the bomb. After removal of the solvent, the residue was distilled at 0.01 mm. and a bath temperature of 85° C. to give a colorless liquid.

|   | Found | Calculated for $(F_2NCH_2)_2N\overset{O}{\overset{\|}{C}}-CH_3$ |
|---|---|---|
| C | 27.2 | 25.4 |
| N | 21.0 | 22.2 |
| F | 36.5 | 40.1 |

The analysis and IR spectrum are consistent with the structure N,N bis(difluoraminomethyl)acetamide.

It has been found, in accordance with the experiments described, that the replacement of the acetoxy group by an $NF_2$ group proceeds readily when the carbon bearing the acetoxy group is attached to nitrogen bearing a pair of nonbonded electrons such as in a nitramine group.

This permits the formation of a number of high-energy compounds containing a high proportion of the energetic $NF_2$ groups and $NO_2$ groups, which are oxidizing groups for fuel constituents and components such as metals which combine readily with fluorine, carbon and hydrogen.

The compounds containing the sulfone group attached to nitrogen in place of a nitro group, as in the tosyl amides, permits extension of the reaction involving replacement of an acetoxy group to a variety of other organic reactants. Two tosyl amides prepared for reaction with $HNF_2$ are the diacetoxymethyl tosyl amide described in Example 4 and N,N' ditosyl-2,3,5,6-tetraacetoxy piperazine which contains a six-membered heterocyclic group with nitrogen in the ring in the 1 and 4 position.

EXAMPLE 6

The reaction of $HNF_2$ with N,N' ditosyl-2,3,5,6-tetraacetoxy piperazine was carried out similarly in using 1.0 g. of this organic reactant and 4 ml. of dried $CH_2Cl_2$ with 100 mg. of the catalyst and 1 g. $HNF_2$. Reaction was stirred at room temperature for 4 days. After removal of the excess $HNF_2$, the product was removed from the bomb reactor and solvent was taken off. The solid residue had the following characteristics:

|   | Found | Calculated for 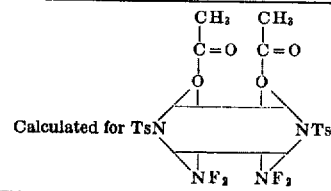 |
|---|---|---|
| C | 43.19 | 43.13 |
| H | 4.33 | 3.95 |
| N | 10.94 | 9.15 |
| F | 14.0 | 12.41 |

The infrared spectrum and elemental analysis indicate replacement of the acetoxy groups took place partially in an initial stage of reaction and that more forceful conditions, such as additional $HNF_2$, higher temperatures, and extension of reaction time, would lead to replacement of the other acetoxy groups so as to form the tetrakis (NF$_2$) derivative.

EXAMPLE 7

To form the 1,4 dinitro-2,3,5,6-tetrakis (NF$_2$) piperazine, the N,N' ditosyl-2,3,5,6-tetrakis (NF$_2$) piperazine is nitrated or the N,N' dinitro piperazine having a replaceable group as a substituent of each methylene group is reacted with HNF$_2$.

EXAMPLE 8

To a 10 cc. glass bomb was added 1.07 gm. of N-ethyl-N-methoxymethyl formamide, (CH$_3$OCH$_2$N(C$_2$H$_5$)CHO), 5.0 ml. of dried CH$_2$Cl$_2$, 100 mg. Amberlyst resin and 1.0 gm. HNF$_2$. The bomb was sealed and stirred at 50° C. for 48 hours. After removing the excess HNF$_2$ the solution was pipetted from the bomb and the solvent distilled off at atmospheric pressure. Distillation of the residue at 0.01 mm. and a bath temperature of 55° C. gave a colorless liquid with the following analyses:

|   | Found | Calculated for C$_2$H$_5$N(CH$_2$NF$_2$)CH | 
|---|---|---|
| C | 38.1 | 34.8 |
| N | 20.5 | 20.3 |
| F | 27.3 | 27.5 |

The above analyses and the IR spectrum are consistent with the structure N-ethyl-N-difluoraminomethyl formamide.

EXAMPLE 9

To a 10 cc. glass bomb was added 0.49 gm. of bis (chloromethyl)ethylene dinitramine, 2.0 ml. dried CH$_2$Cl$_2$, 100 mg. of Amberlyst catalyst and 0.5 gm. of HNF$_2$. The bomb was sealed and the reaction was stirred overnight at room temperature. After removal of the XS HNF$_2$ the solution was pipetted from the bomb and the solvent was pumped off to leave a solid residue. The analysis below and its IR spectrum indicated a mixture:

|   | Found | Calculated for (F$_2$NCH$_2$—N(NO$_2$)—CH$_2$)$_2$ |
|---|---|---|
| %F | 9.3 | 27.1 |

12 Purification of the above mixture would give N,N' bis (difluoraminomethyl) ethylenedinitramine identical with that material obtained in Example 1. Longer reaction times and higher temperatures may give higher yields of the desired material.

The products obtained by this new reaction are new high-energy compounds suitable for use as monopropellants, oxidizing components in solid propellants, particularly propellants which are to be used as rocket propellants having energy values above 270 Isp (specific impulse).

In essence, the general procedure of the present invention allows a new family of high-energy compounds to be prepared from aliphatic nitrogen-containing compounds and analogous heterocyclic organic compounds in which the nitrogen is linked to a negative function and to carbon that is linked to a functional group replaceable by NF$_2$.

Products obtained which have high-energy values as oxidizers in solid rocket propellants, are those which tend to have about one or more oxidizer groups (NF$_2$ or NO$_2$) per carbon atom as in the general compositional formula:

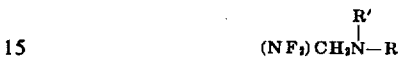

wherein R' is a nitro group and R an alkyl group, e.g., —CH$_3$, —C$_2$H$_5$, an NF$_2$ substituted alkyl group, e.g., —CH$_2$(NF$_2$) or an NF$_2$ substituted methyl nitramine alkylene group, e.g., —CH$_2$N(NO$_2$)CH$_2$(NF$_2$) or —CH$_2$CH$_2$N(NO$_2$)CH$_2$(NF$_2$). The heterocyclic analog is 1,4 dinitro-2,3,5,6-tetrakis (NF$_2$) piperazine,

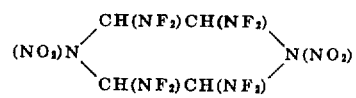

Representative evaluations indicate that as monopropellants, the N,N' bis(difluoraminomethyl) methylene dinitramine has an Isp of 284.8, bis(difluoraminomethyl) nitramine has an Isp of 296.9, and the dinitro-tetrakis (NF$_2$) piperazine an Isp of 295.1. Each of these oxidizers in a composite with 1 to 9 percent B powder, 20 percent of binder containing 48% 71 NF$_2$, e.g., poly(bis(NF$_2$) propyl acrylate makes a propellant having an IS Isp in the range of 270 to 290.

The many surprisingly successful reactions performed according to the principles set forth show that the organic nitrogen-containing compounds react with HNF$_2$ to replace the replaceable acyloxy, halo, and alkoxy groups, can be of the open-chain and cyclic analog types.

Examples of aliphatic N-containing organic reactants having suitable negative functions linked to the nitrogen with a replaceable function linked to its alpha carbon are listed as follows:

ALIPHATIC N-COMPOUNDS (1) (CH$_3$COOCH$_2$)$_2$N—F (or other halogen)
(2) (CH$_3$COOCH$_2$)$_2$N—OH
(3) (CH$_3$COOCH$_2$)$_2$N—NO$_2$
(4) (CH$_3$COOCH$_2$)$_2$N—SO$_2$C$_6$H$_4$·CH$_3$
(5) (CH$_3$OCH$_2$) (C$_2$H$_5$)N—CHO
(6) (ClCH$_2$)N(NO$_2$)CH$_2$N(NO$_2$)(CH$_2$Cl)
(7) (CH$_3$OCH$_2$)$_2$N—SO$_2$·CH$_3$
(8) 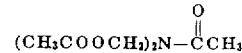
(9) 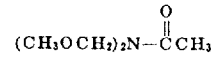
(10) (CH$_3$COOCH$_2$)N(NO$_2$)CH$_2$N(NO$_2$)(CH$_2$OOCCH$_3$)
(11) (CH$_3$COOCH$_2$)N(NO$_2$)CH(NF$_2$)CH(NF$_2$)N(NO$_2$)(CH$_2$OOCCH$_3$)

The list of N-aliphatic reactants can be extended by varying the replaceable groups, acyloxy or acetoxy, $C_nH_{2n+1}COO-$, chloro, and alkoxy, $C_nH_{2n+1}O-$, linked through the methylene carbon, $-CH_2-$, to the N which is linked to the negative function; halo-Cl, F, $-OH$, $-NO_2$, sulphonyl $-SO_2-$, or acyl $-COC_nH_{2n+1}$. In these compounds the N atom is linked to the replaceable groups through the methylene group and, in general, is linked to two $-CH_2-$ groups while it is also linked to the negative groups. The size of the alkyl group in the acyloxy function, $C_nH_{2n+1}COO-$, the acyl function, $-COC_nH_{2n+1}$, the alkoxy function, $C_nH_{2n+1}O-$, the sulfonyl—$SO_2·C_nH_{2n+1}$, any alkyl attached directly to the N can be varied, although it is preferably $CH_3-$ or $C_2H_5-$. The sulfonyl may be an alkyl sulfone, aryl sulfone or an alkaryl sulfone radical.

Analogously, the N attached to alpha carbons which are linked to the described kinds of replaceable groups R" are attached to a negative function R' may be in cyclic alkylene imines, said alpha carbons being in the ring and having R" replaceable groups as substituents for H in the $-CH_2-$ groups. The cyclic alkylene imines containing the R" substituents and R' negative groups attached to the N may be selected from compounds such as ethylene imine to pentamethylene imine, diethylene diimine (piperazine), trimethylene ethylene diimine, and homologs. With the R" replaceable groups and R' negative groups as substituents, these compounds are exemplified by the following structure as in piperazine:

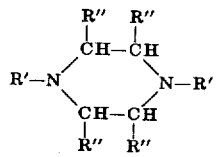

wherein R' is $-SO_2R$, $-CHO$, $-C(CH_3)O$, $-NO_2$, $-F$, $-Cl$, or $-OH$; R here representing alkyl, aryl or aralkyl; and R" is $-OOCCH_3$, $-OCH_3$, $-Cl$, acid higher homologous acyloxy and alkoxy functions.

Since the organic reactant reacted with $HNF_2$ may have the $-NF_2$ group replace the replaceable function in stages, a generalized formula for the products is set forth as:

$(NF_2)CH_2-N(R')-(CH_2)_n-D'''$ wherein R' is the negative function as described, e.g., nitro, D''' is a moiety such as $NF_2$, replaceable acyloxy, alkoxy, or chloro, function, an alkyl radical or $-N(R')CH_2NF_2$ radical, the subscript n representing one to two ($CH_2$) groups between the nitrogen atoms linked to R' functions when D''' is $-N(R')CH_2NF_2$ otherwise being one; and said compound in the cyclic analog form having in a ring one to two nitrogens each linked to an R' function and to two carbons in the ring, the carbons in the ring being in $-CH(NF_2)-$ groups except for any other carbon in the ring being linked to one of the replaceable functions and to a hydrogen atom.

For the preferred aliphatic nitramine compounds in which $NF_2$ replaces the replaceable functions, the composition may be generalized as:

$(NF_2)CH_2N(NO_2)(CH_2)_nD'''$ where D''' is a moiety of the group consisting of:
a. $-CH_3$
b. $-NF_2$
c. $-N(NO_2)CH_2(NF_2)$ the subscript n representing one ($-CH_2-$) interlinking the imino N with D''' for (a) and (b) and representing one to two ($-CH_2-$) groups interlinking the imino N with the D''' moiety of (c).

In a more generalized formula of the products represented by:

$(NF_2)CH_2-N(R')-(CH_2)_n-D'''$ the R' substituent is a negative function selected from the group consisting of nitro, sulfonyl, aldo, acyl, hydroxyl and halo functions; the D''' moiety is selected from the group consisting of difluoramino, replaceable acyloxy, alkoxy, and halo functions, alkyl, and the $-N(R')CH_2NF_2$ radical, subscript n representing one to two ($-CH_2-$) groups, n being two when the ($-CH_2-$) groups are between $-N(R')-$ groups.

In the cyclic analog form the products have one to two N atoms of $-N(R')-$ groups in the ring, and the two carbon atoms linked to these N atoms in the ring are in $-CH(NF_2)-$ groups instead of the $-(CH_2)-$ groups except for such ring carbon atoms as retain a replaceable function and a hydrogen atom.

Similarly, the generalized formula of the products is modified for a more complex compound such as N,N' bis(difluoraminomethyl)-1,2-bis(difluoramino)ethylene dinitramine having the formula:

$(NF_2)CH_2N(NO_2)CH(NF_2)CH(NF_2)N(NO_2)CH_2(NF_2)$ by having $-CH(NF_2)-$ groups instead of the $-(CH_2)-$ groups between the nitro substituted imino nitrogens. This particularly high-energy compound is to be prepared in a manner similar to that described in Example 1 with the dinitramine reactant having $-NF_2$ groups as substituents in the ethylene link between the N atoms.

It is to be noted that when the replacement of the replaceable functions, acyloxy, alkoxy, and halo by $-NF_2$ groups goes in stages, intermediate products may have some of the replaceable groups remaining.

The replacement reaction is preferably carried out under ordinary atmospheric conditions of temperature and pressure, as indicated but these conditions may be varied as indicated.

Products other than those having the nitramines or nitramides containing $NO_2$ groups can be used as intermediates for reaction with compounds that add energy groups. For example, acyl groups may be reacted with $HNO_3$ in another stage to replace the acyl group by an $NO_2$ group and the tosyl amides may be converted by nitration to nitramides or nitramines. The compounds containing -OH as a negative group are energetic as such or can be converted to other compounds. The chloro groups can be further replaced or reacted to form larger molecules.

The invention described is claimed as follows:

1. A compound having the composition of the general formula:

where R' is a negative function of the group consisting of nitro, sulfonyl, aldo, acyl, hydroxyl, and halo;

D''' is a moiety of the group consisting of $-NF_2$, acyloxy, alkoxy and halo functions, alkyl, and a $-N(R')CH_2NF_2$ radical, subscript $n$ representing one to two ($-CH_2-$) groups between two $-N(R')-$ groups, otherwise being one;

said compound in the cyclic analog form having one to two $-N(R')-$ groups, each linked to two carbons in the ring, the carbons in the ring being in $-CH(NF_2)-$ groups instead of ($-CH_2-$) groups except for any other carbons in the ring linked to one of the mentioned replaceable functions and to a hydrogen atom; and said compound also taking the form $(NF_2)CH_2-N(R')-(CHNF_2)_2-D'''$ when D''' is the radical $-N(R')CH_2NF_2$.

2. A compound having the composition:

$$(NF_2)CH_2N(NO_2)(CH_2)_nD'''$$

where D''' is a moiety of the group consisting of:
(a) $-CH_3$
(b) $-NF_2$
(c) $-N(NO_2)CH_2(NF_2)$ the subscript n represents one ($CH_2$) group interlinking $N(NO_2)$ with D''' for moieties (a) and (b) and representing one to two ($CH_2$) groups interlinking the $-N(NO_2)-$ with the D''' of moiety (c).

3. The compound N,N' bis(difluoraminomethyl) ethylene dinitramine having the formula:

4. The compound N,N' bis(difluoraminomethyl) methylene dinitramine having the formula:

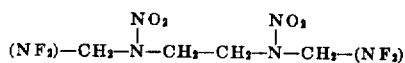

5. The compound N,N bis(difluoraminomethyl) nitramine having the formula:

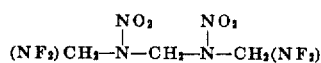

6. The compound N,N bis(difluoraminomethyl)tosyl amide having the formula:

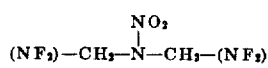

7. The compound N,N bis(difluoraminomethyl)acetamide having the formula:

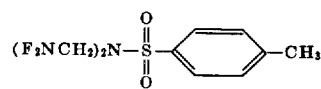

8. The compound N,N' ditosyl-2,3-difluoroamino5,6-diacetoxy piperazine.

9. The compound 1,4-dinitro2,3,5,6-tetrakis ($NF_2$) piperazine.

10. Method of preparing an $NF_2$-containing compound from an organic nitrogen-containing compound in which a replaceable function of the group consisting of acyloxy, alkoxy, and chloro is linked to a carbon alpha to a nitrogen atom in the organic compound and a negative function of the groups consisting of nitro, sulfonyl, aldo, acyl, hydroxyl, and a halo function of the group consisting of fluoro and chloro, is linked to said nitrogen atom, which comprises reacting the organic compound with $HNF_2$ under reaction conditions to replace the replaceable function by a difluoramino group and recovering a resulting $NF_2$-containing compound wherein $NF_2$ replaces the replaceable function of the organic nitrogen-containing compound.

11. Method of preparing an $NF_2$-containing compound which comprises reacting $HNF_2$ under reaction conditions with an organic imine reactant having the composition:

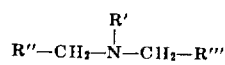

where R'' is a replaceable acetoxy group, R' is a nitro group, and R''' is selected from alkyl, acetoxy, and acetoxy methyl nitramine groups with one to two $-CH_2-$ groups between the nitrogens attached to $-NO_2$ in nitramine groups, and recovering a resulting product in which $-NF_2$ groups replace acetoxy groups in the organic imine reactant.

12. Method of preparing an $NF_2$-containing compound which comprises reacting $HNF_2$ under reaction conditions with a substituted cyclic alkylene imine which has C and N atoms in a ring with a replaceable function of the group consisting of acyloxy alkoxy, and chloro linked to each of the ring C atoms and a negative function of the group consisting of nitro, sulfonyl, aldo, acyl, hydroxyl and a halo function of the group consisting of fluoro and chloro linked to the N atoms, said replaceable and negative functions being the substituents. and recovering a resulting product of the substituted cyclic alkylene imine containing $-NF_2$ linked to the C atoms in the ring in place of the replaceable function.

13. Method of preparing N,N' bis(difluoraminomethyl) ethylene dinitramine, which comprises reacting N,N' diacetoxymethyl ethylene dinitramine with $HNF_2$ in an amount to replace the acetoxy groups by $NF_2$ groups, and recovering the resulting difluoramino derivative of the dinitramine.

14. Method of preparing N,N' bis(difluoraminomethyl) methylene dinitramine, which comprises reacting N,N' diacetoxymethyl methylene dinitramine with $HNF_2$ in a proportion to replace the acetoxy groups by $NF_2$ groups, and recovering the resulting difluoramino derivative.

15. Method of preparing N,N bis(difluoraminomethyl) nitramine, which comprises reacting N,N diacetoxymethyl nitramine with a proportion of $HNF_2$ to replace the acetoxy groups by $NF_2$ groups, and recovering the resulting difluoramino derivative.

16. Method of preparing N,N bis(difluoraminomethyl)tosyl amide, which comprises reacting N,N di(acetoxymethyl)tosyl amide with sufficient $HNF_2$ to replace the acetoxy groups by $NF_2$ groups, and recovering the resulting difluoramino derivative of the tosyl amide.

17. Method of preparing N,N bis(difluoraminomethyl) acyl amide which comprises reacting N,N di(acetoxymethyl) acyl amide with sufficient $HNF_2$ to replace the acetoxy groups by $NF_2$ groups, and recovering the resulting difluoramino derivative.

18. Method of preparing N,N' ditosyl 2,3-difluoramino 5,6-diacetoxy piperazine which comprises reacting N,N' ditosyl-2,3,5,6-tetraacetoxy piperazine with sufficient $HNF_2$ to replace two of the acetoxy groups, and recovering the resulting difluoramino derivative of the piperazine.

19. Method of preparing N,N' ditosyl-2,3,5,6-tetrakis ($NF_2$) piperazine which comprises reacting N,N' ditosyl 2,3-difluoramino 5,6-diacetoxy piperazine with $HNF_2$ to replace the acetoxy groups and recovering the resulting tetrakis ($NF_2$) derivative.

20. Method of preparing N,N' dinitro-2,3,5,6-tetrakis ($NF_2$) piperazine which comprises replacing tosyl functions from N,N' ditosyl-2,3,5,6-tetrakis piperazine by nitro groups.

* * * * *